UNITED STATES PATENT OFFICE 2,486,376

COPOLYMER OF BUTADIENE AND BORNYL METHACRYLATE

Alfred B. Craig and David T. Mowry, Dayton, Ohio, assignors to Monsanto Chemical Company, St. Louis, Mo., a corporation of Delaware No Drawing. Application December 4, 1947, Serial No. 789,773

1 Claim. (Cl. 260—83.5)

This invention relates to new synthetic rubber compositions having very desirable properties. More particularly the invention relates to copolymers of hydrocarbon dienes and the acrylic and methacrylic esters of alicyclic alcohols having two fused rings.

Synthetic rubbers made from hydrocarbon dienes and the acrylic esters are well known. Of these known acrylic copolymer rubbers, the copolymers of esters of the lower molecular weight alkyl alcohols are known to possess superior properties to the copolymers of the alkyl esters of higher molecular weight. It is therefore the fundamental purpose of this invention to provide new synthetic rubbers made from high molecular weight alcohols which have unusually high tensile strength and resiliency. A further purpose of this invention is to provide a new class of synthetic rubbers having properties superior to conventional synthetic rubbers of GR-S type.

In accordance with this invention it has been found that copolymers of hydrocarbon dienes, and acrylic esters of alcohols having two fused rings have excellent physical and chemical properties. Useful copolymers for the practice of this invention are those prepared by the conjoint polymerization of butadiene, isoprene, or 2,3-dimethylbutadiene, with esters of acrylic or methacrylic acid and an alcohol, such as borneol, fenchyl alcohol, isoborneol, norborneol or other alicyclic alcohol having two fused rings.

The new synthetic rubbers may also be prepared by the copolymerization of hydrocarbon dienes with acrylic or methacrylic esters of various new alcohols not known or described in the prior art. For example, freshly distilled cyclopentadiene may be condensed with allyl alcohol by a Diels and Alder reaction to form 2,5-methano-tetrahydrobenzyl alcohol. Another useful alcohol is the 2,5-methano-hexohydrobenzol alcohol which may be prepared by the hydrogenation of 2,5-methano-tetrahydrobenzol alcohol. Another new alcohol is the 6-methyl-2,5-methano-hexahydrobenzyl alcohol which may be prepared by the Diels and Alder condensation of freshly distilled cyclopentane with crotonaldehyde followed by a hydrogenation procedure to convert the resulting aldehyde to an alcohol. These and other new alcohols may be esterfied with acrylic or methacrylic acid and the resulting ester copolymerized with butadiene or other conjugative hydrocarbon diene to form synthetic rubber in accordance with this invention.

In the practice of this invention from 40 to 90 per cent of a hydrocarbon diene having the structural formula:

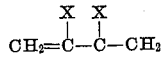

wherein X is a radical of the group consisting of hydrogen and methyl, and from 10 to 60 percent of acrylic or methacrylic ester of an alicyclic alcohol having two fused rings. Suitable dienes are butadiene, isoprene and 2,3-dimethyl butadiene.

The polymerizations are effected in aqueous emulsions in the presence of an oxygen yielding catalyst, such as sodium perborate, hydrogen peroxide, sodium persulfate and other peroxy compounds or salts of peroxy acids having the molecular grouping (—O—O—), from 0.005 to 1.0 percent by weight being used. The aqueous emulsions are usually stabilized by the presence of a small amount, for example from 1 to 5 percent by weight, of a substance having both hydrophobic and hydrophilic radicals, such as rosin soap, sulfonated hydrocarbons, water soluble salts of sulfuric acid esters of long chain alkyl alcohols, triethanoamine and other amino soaps, the water soluble salts of high molecular weight fatty acids including the mixtures obtained by saponification of animal and vegetable fats, and other similar compounds.

The polymerizations are conducted by charging the mixed monomers, water, peroxy catalyst, and emulsifying agent into a suitable reactor which is provided with a means for agitating the reaction mass. The agitation may be accomplished by tumbling the reactor, by stirring the contents with a suitable rotary stirring mechanism, or by any other means which stimulates the intimate contact between monomer and the various reagents charged to the vessel. During the reaction the reaction vessel and its contents are maintained at a temperature between 30° and 80° C., for the purpose of inducing a rapid polymerization. Since the polymerization reaction evolves heat, care should be taken to avoid excessive temperatures and reaction rates such that the heat of polymerization cannot be removed from the reaction vessel. The temperature of polymerization should be so controlled that a uniform rate of polymerization is achieved throughout the reaction. As the polymerization is complete, or substantially complete, the emulsion is precipitated by the addition of water soluble salts, acids or alcohols or any other substance which destroys the effectiveness of the emulsifying agent and permits the separation of aqueous liquor from the solid particles of rubber, which is then separated by filtration. The granular rubber may be pressed into suitable sized cakes for storage or further processing. The new rubber may be compounded with the usual vulcanizing agents, for example, antioxidants, accelerators and pigments with any conventional machinery, for example roll mills and Banbury mixers.

The new rubber is a good general purpose rubber but is especially suitable in applications requiring high tensile strength and elongation.

Further details of the preparation and compounding of the new rubbers are set forth with respect to the following examples.

Example 1

A stainless steel bomb, having a capacity of 1.6 liters, was charged with the following materials:

Bornyl methacrylate _____ grams__ 75
Butadiene _____ do____ 225
Distilled water _____ cc____ 750
Soap (principally sodium stearate) _____ grams__ 15
Potassium persulfate _____ do____ 0.9
Dodecyl mercaptan _____ do____ 1.5

The bomb was sealed and tumbled in a circulating hot air oven maintained at 50° C. The tumbling was continued until the bomb pressure was reduced to twenty pounds per square inch, indicating conversion of between 75 and 80 percent. The bomb was cooled and 0.1 percent by weight of the monomer of hydroquinone was added.

An antioxidant emulsion was prepared separately by dissolving 4.5 grams of a reaction product of acetone and para-aminobiphenyl in 25 ml. of benzene. This mixture was then added with stirring to a solution of 0.75 gram of soap in 75 cc. of water. The resulting emulsion was added to the latex. The latex was then coagulated by adding an equal portion of a solution comprised of the following:

Sodium chloride _____ grams__ 189
Distilled water _____ ml__ 1,330
Glacial acetic acid _____ ml__ 1.64
Aluminum sulfate _____ grams__ 1.64
Isopropyl alcohol _____ ml__ 300

The resulting precipitate was washed with distilled water and dried in a circulating hot air oven.

Example 2

To demonstrate the beneficial result achieved through the copolymerization of the fused ring alcohol esters, copolymers of 75 percent butadiene and 25 percent of various acrylic esters were prepared using the method described in Example 1. Samples were made using methyl methacrylate, dodecyl methacrylate, phenyl methacrylate and bornyl methacryl, and all copolymers were compounded using a standard procedure and a cold roll mill. The following compounding reagents were used:

| | Parts by weight |
|---|---|
| Copolymer | 100.0 |
| Black (Kosmobile 77) | 40.0 |
| Zinc oxide | 3.0 |
| Stearic acid | 1.0 |
| Reaction product of acetone and p-amino biphenyl | 1.0 |
| Sulfur | 2.0 |
| N-cyclohexyl-2-benzothiazyl sulfenamide | 1.2 |

After each composition was thoroughly mixed, the samples were sheeted, cut to test strips, and cured by heating at 142° C. The test strips were evaluated using the standard methods of determining tensile strength, elongation, etc.

| Comonomer | Cure Minutes at 142° C. | Unaged | | 24 hrs. age @ 100° C. | |
|---|---|---|---|---|---|
| | | Tensile Strength | Elongation | Tensile Strength | Elongation |
| Methyl Methacrylate | 60 | 2,340 | 510 | 2,360 | 385 |
| | 90 | 2,355 | 495 | 2,070 | 370 |
| Dodecyl Methacrylate | 60 | 1,330 | 430 | 1,770 | 360 |
| | 90 | 1,385 | 420 | 1,645 | 400 |
| Phenyl Methacrylate | 60 | 1,320 | 625 | 1,605 | 495 |
| | 90 | 1,200 | 600 | 1,535 | 490 |
| Bornyl Methacrylate | 60 | 2,890 | 655 | 3,095 | 570 |
| | 90 | 2,645 | 615 | 2,730 | 530 |

The above table demonstrates that the copolymers of the methacrylate of fused ring alcohols are superior to the copolymers prepared from other types of methacrylic esters and very much superior to the copolymers of esters of comparable molecular weight.

Example 3

Using the procedures identical to those described in Example 1 a copolymer of 75 percent butadiene and 25 percent of bornyl methacrylate and a copolymer of 75 percent butadiene and 25 percent styrene were prepared, compounded and tested. The following table indicates the comparative tensile strength and elongation after curing at 142° C. for 60 and 90 minute periods.

| Comonomer | Minutes Cure | Tensile Strength, #/sq. in. | Elongation, Percent |
|---|---|---|---|
| Bornyl Methacrylate | 60 | 3,235 | 420 |
| | 90 | 2,905 | 375 |
| Styrene | 60 | 2,410 | 355 |
| | 90 | 2,490 | 330 |

This example demonstrates the superiority of the subject matter of this invention over conventional synthetic rubbers.

Although this invention has been described with respect to specific examples, it is not intended that the scope shall be limited by the details thereof, except to the extent incorporated in the following claim.

We claim:

A copolymer of 40 to 90 percent of butadiene and from 10 to 60 percent of bornyl methacrylate.

ALFRED B. CRAIG.
DAVID T. MOWRY.

REFERENCES CITED

The following references are of record in the file of this patent:

UNITED STATES PATENTS

| Number | Name | Date |
|---|---|---|
| 2,363,044 | Clifford | Nov. 21, 1944 |